United States Patent
vonThenen et al.

(10) Patent No.: US 10,467,034 B1
(45) Date of Patent: Nov. 5, 2019

(54) PERFORMING APPLICATION SPECIFIC ACTIONS WITHOUT IN-GUEST CREDENTIAL INFORMATION

(71) Applicant: EMC IP Holding Company LLC, Hopkinton, MA (US)

(72) Inventors: David vonThenen, Tustin, CA (US); Steven Wong, Cerritos, CA (US); Karen Gabler, Hopkinton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 165 days.

(21) Appl. No.: 15/281,519

(22) Filed: Sep. 30, 2016

(51) Int. Cl.
*G06F 9/455* (2018.01)

(52) U.S. Cl.
CPC ...... *G06F 9/45533* (2013.01); *G06F 9/45545* (2013.01)

(58) Field of Classification Search
None
See application file for complete search history.

(56) References Cited

U.S. PATENT DOCUMENTS

| | | | | |
|---|---|---|---|---|
| 8,365,294 B2 * | 1/2013 | Ross | | G06F 21/33 370/229 |
| 8,910,155 B1 * | 12/2014 | Sobel | | G06F 9/445 718/1 |
| 2010/0070725 A1 * | 3/2010 | Prahlad | | G06F 11/1453 711/162 |
| 2011/0185355 A1 * | 7/2011 | Chawla | | G06F 9/5077 718/1 |
| 2013/0007733 A1 * | 1/2013 | Fries | | G06F 9/45558 718/1 |
| 2013/0311763 A1 * | 11/2013 | Saborowski | | G06F 9/445 713/2 |
| 2015/0324216 A1 * | 11/2015 | Sizemore | | G06F 9/45558 718/1 |

* cited by examiner

*Primary Examiner* — Kenneth Tang
(74) *Attorney, Agent, or Firm* — Dergosits & Noah LLP; Todd A. Noah (57) ABSTRACT

Disclosed are systems and methods for using a virtual media device to communicate messages to one or more applications running in a virtual machine (VM) without the need to expose credential information. Based on a media image having been mounted on a virtual media device of the VM, a notification may be generated to enable an agent in the VM to access the media image. The media image may include a message for one or more applications running in the VM. The agent may be configured to retrieve the message and to communicate the message to the one or more applications to enable the one or more applications to perform operations based on the message. The agent may be configured to eject the virtual media device based on completion of the operations.

15 Claims, 8 Drawing Sheets

PERFORMING APPLICATION SPECIFIC ACTIONS WITHOUT IN-GUEST CREDENTIAL INFORMATION

BACKGROUND

The present invention relates to the field of information technology, including, more particularly, to systems and techniques for controlling operations in a virtual machine (VM).

In a VM environment, there may be multiple VMs, each associated with its own guest operating system (OS). Typically, credential information is required to access the guest OS and to communicate with applications running in the VM environment. Existing methods of communicating the credential information to the VM either require management overhead or compromise the security of the credential information.

DETAILED DESCRIPTION

For some embodiments, systems and methods for using a virtual media device associated with a virtual machine (VM) to communicate information from outside of the VM to an application running in the VM. A media image may be generated to include a message. The media image may be mounted in to virtual media device. An agent running in the VM may be configured to detect the mounting of the media virtual media device, to retrieve the message from the media image, and to communicate the message to the application. Operations may be performed by the application based on information included in the message. The agent may further be configured to cause the virtual media device to eject. Such ejection may indicate that the application has completed the operations.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 1:
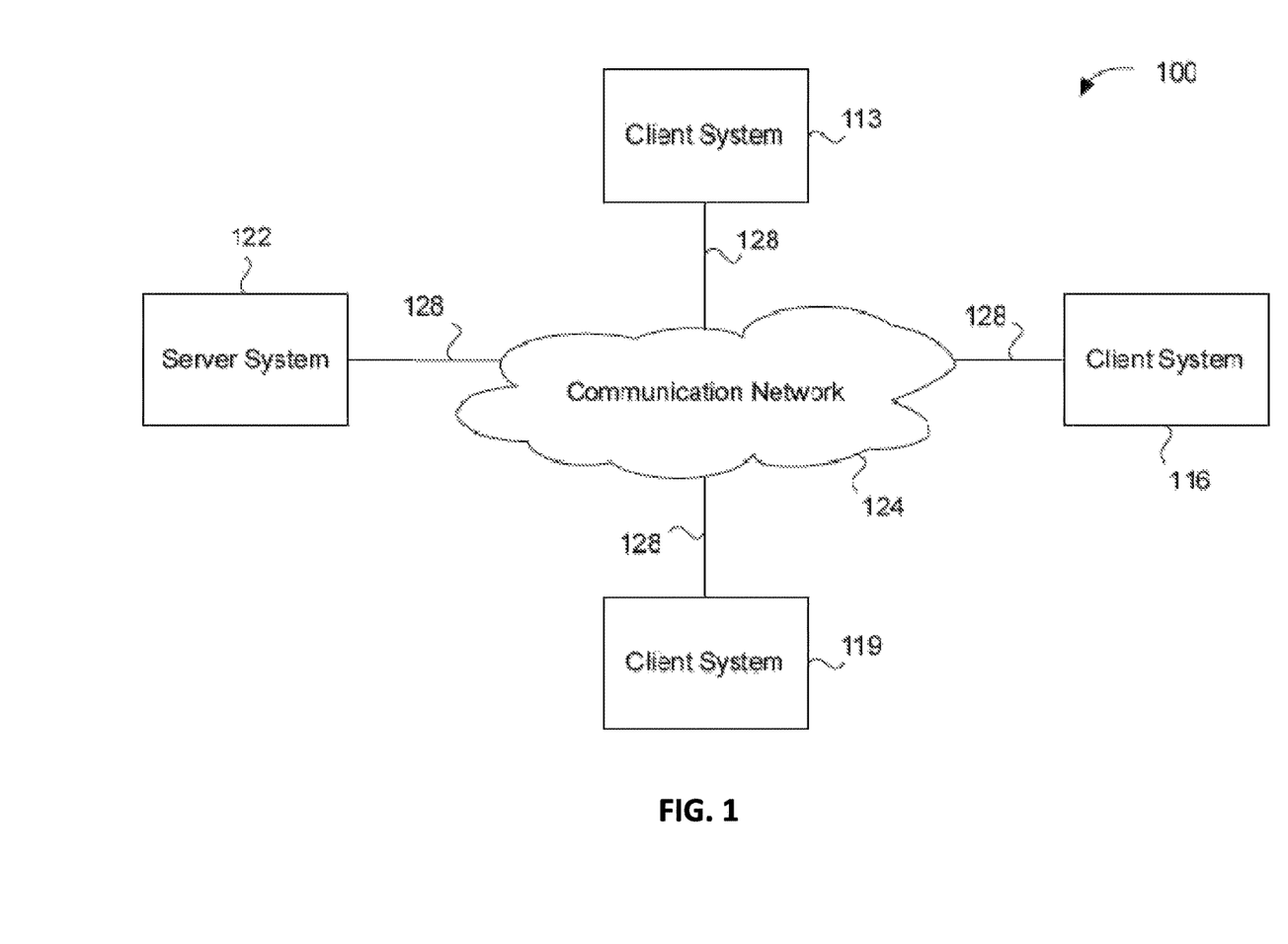
FIG. 1 shows a block diagram of a client-server system and network, implemented in accordance with an exemplary embodiment.

Prior to describing the subject matter in detail, an exemplary computer network in which the subject matter may be implemented shall first be described. Those of ordinary skill in the art will appreciate that the elements illustrated in FIG. 1 may vary depending on the system implementation. With reference to FIG. 1, FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
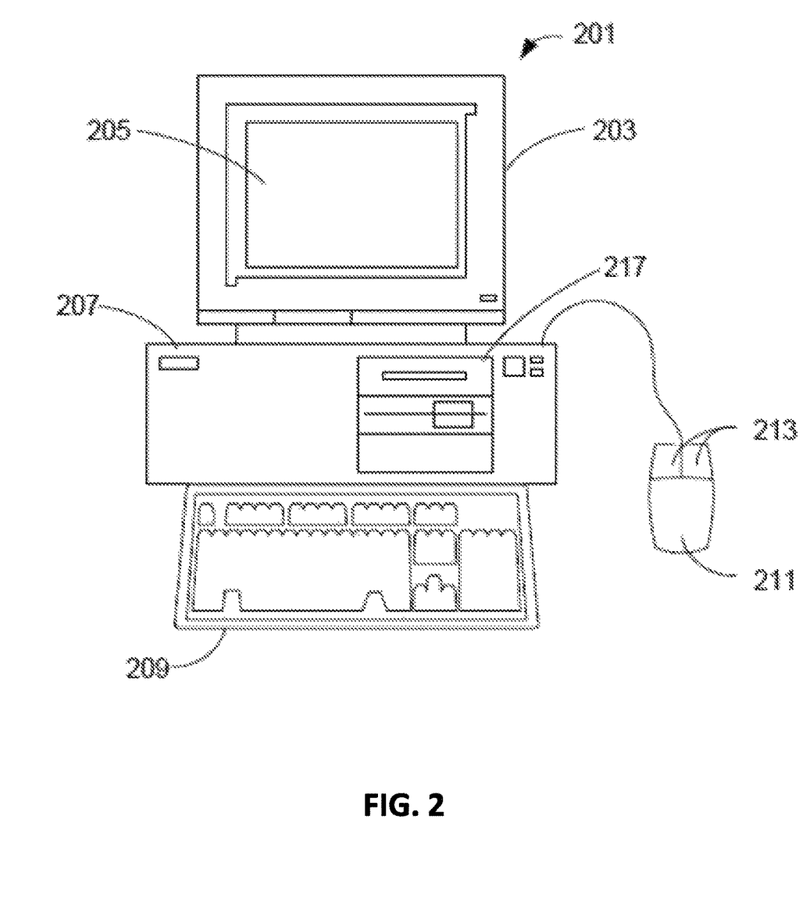
FIG. 2 shows a more detailed diagram of an exemplary client or computer, implemented in accordance with an exemplary embodiment.

FIG. 2 shows an exemplary client or server system. In an embodiment, a user interfaces with the system through a computer workstation system, such as shown in FIG. 2. While FIG. 2 illustrates a computer workstation, the user can interface with the system through a mobile device such as a mobile phone, laptop computer or computer tablet. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of various implementations may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of software may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
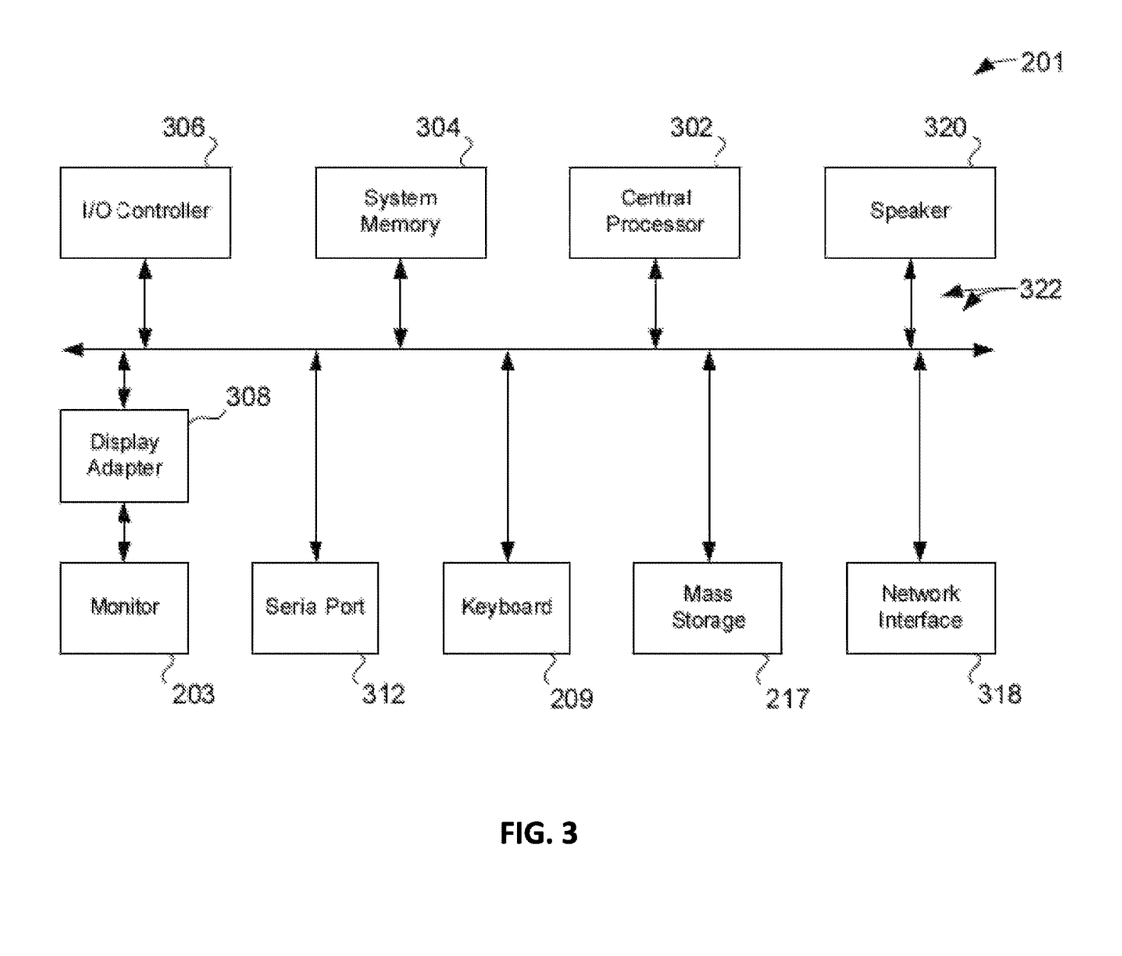
FIG. 3 shows a system block diagram of a client computer system, implemented in accordance with an exemplary embodiment.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
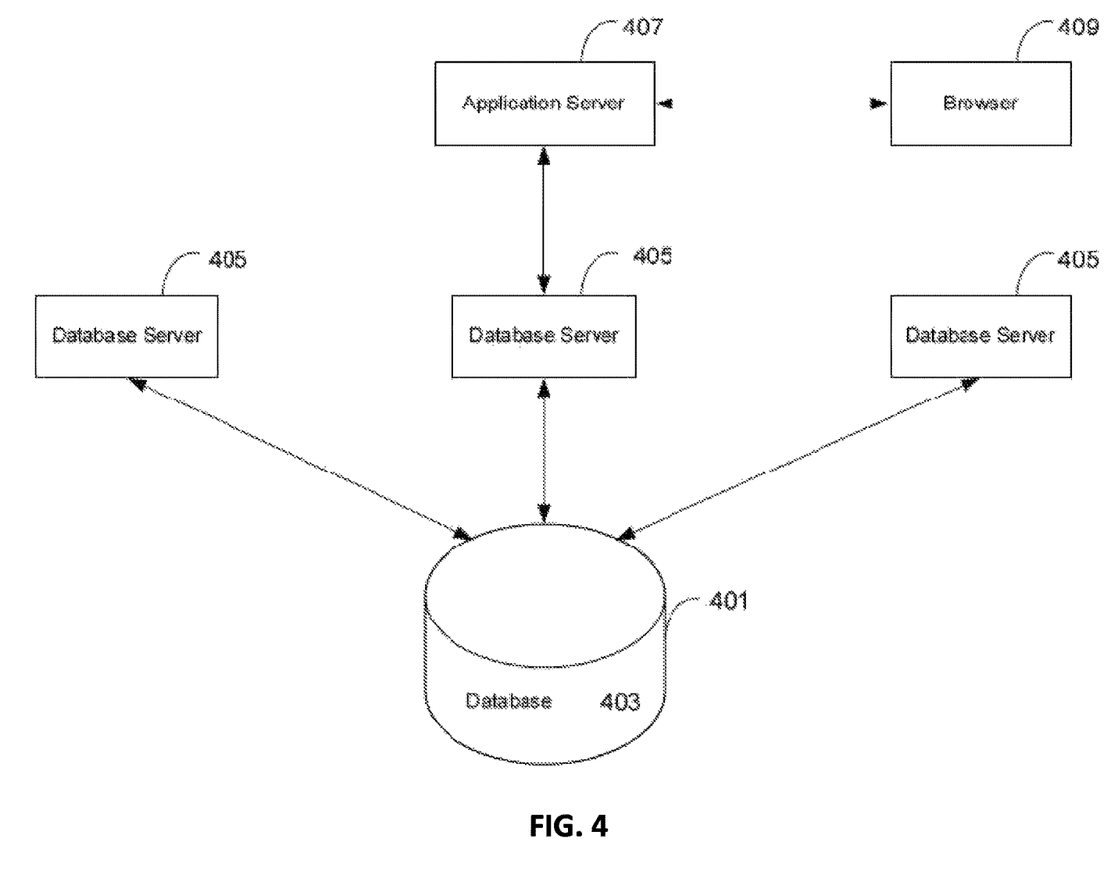
FIG. 4 shows a data source or data service in the form of a database system, implemented in accordance with an exemplary embodiment.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
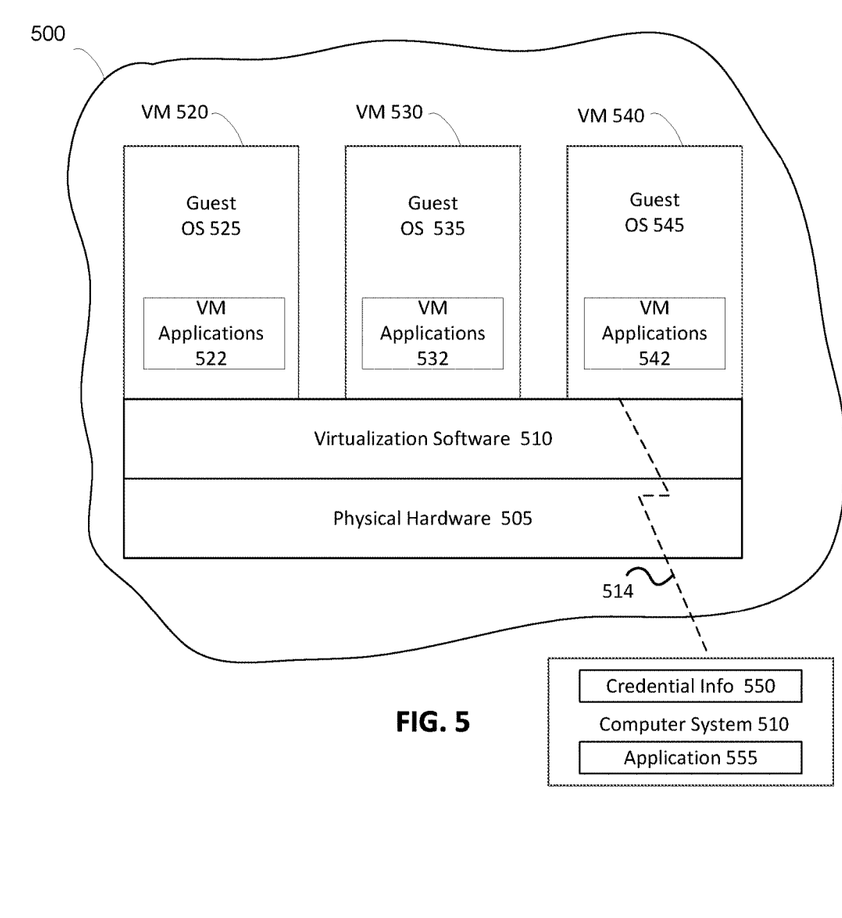
FIG. 5 shows an example of using credential information in a VM environment, in accordance with some embodiments.

FIG. 5 shows an example of using credential information in a VM environment, in accordance with some embodiments. Computer system 500 in this example may include physical hardware 505 and virtualization software 510. Multiple VMs may be realized using the virtualization software 510, including VMs 520, 530 and 540. Each of the VMs may be associated with a guest OS such as guest OS 525, 535 or 545. One or more applications may be running in each VM such as applications 522, 532 or 542. The applications 522, 532 and 542 may be referred to as VM applications. The computer system 500 along with its virtualization software 510 and its VMs 520, 530, 540 may be referred to as a VM environment. FIG. 5 also shows computer system 510 external to the VM environment. Typically, when an application 555 running in the computer system 510 wants to interact with a VM application 542 in the VM 540, credential information 550 may be required by the guest OS 545 over communication path 514 to login to the VM 540. However, as mentioned above, this may not be a desirable approach.

Figure 6:
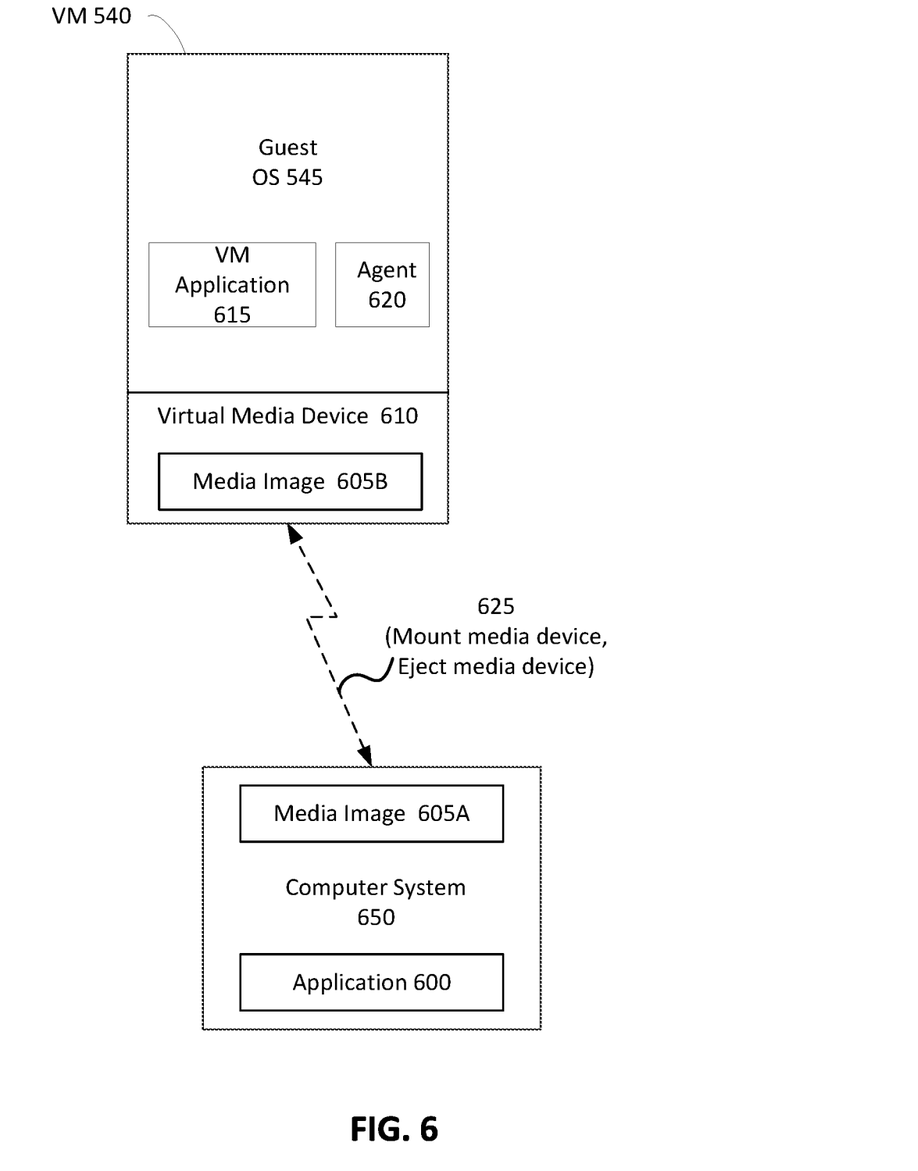
FIG. 6 shows an example of using a virtual media device in a VM environment, in accordance with some embodiments.

FIG. 6 shows an example of using a virtual media device in a VM environment, in accordance with some embodiments. Instead of communicating the credential information to login to the guess OS, a media image may be used to communicate a message to the VM application via a virtual media device. In this example, the VM 540 may include a virtual media device 610 (e.g., a CDROM). An agent 620 may also be running in the VM 540 along with a VM application 615. When the application 600 in the computer system 650 wants to communicate with the VM application 615, a media image 605A may be generated. The media image 605A may include a message for the VM application 615. A protocol may be shared by the application 600 and the agent 620 regarding where the message may be located in the media image. The media image 605A may then be mounted to the virtual media device 610. Path 625 is shown to indicate that the mounting of the virtual media device 610 may generate a notification.

The agent 620 may be monitoring for a notification from the virtual media device 610 that a media image is mounted. When that happens, the agent 620 may access the media image 605A, retrieve the message, and communicate the message to the VM application 615. The message may include commands or scripts that the VM application 615 can use to perform operations. The agent 620 may cause the virtual media device to eject notifying that the operations performed by the VM application 615 are completed. Path 625 is shown to indicate that the ejection of the virtual media device 610 may generate a notification. The agent 620 may update the media image 605A with status information, generating the updated media image 605B. In that situation, the application 600 in the computer system 650 may access the updated media image 605A to retrieve the status information.

Figure 7:
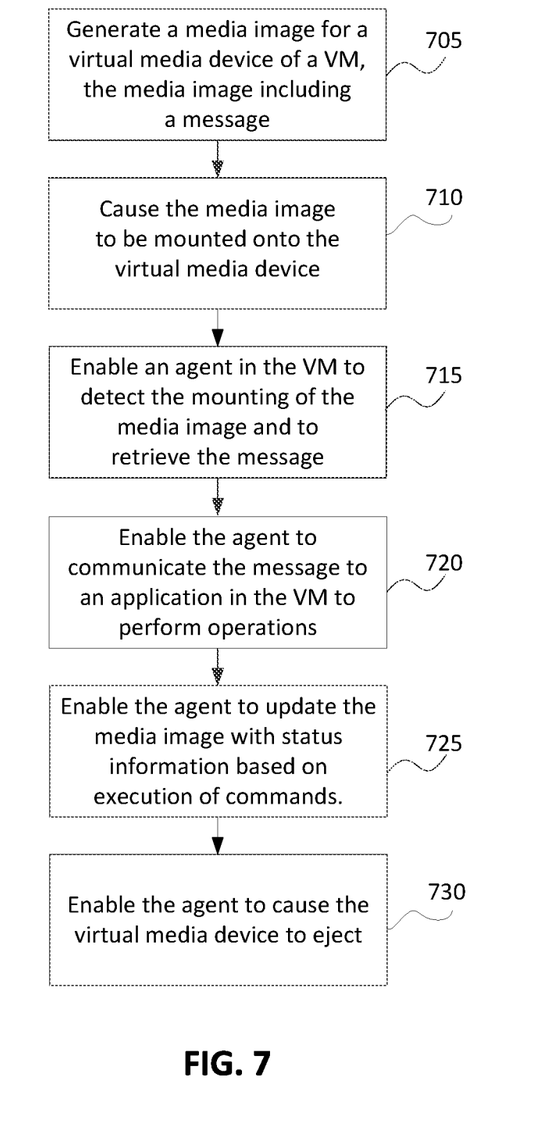
FIG. 7 shows a flowchart of an example method for communicating messages to a VM application using a virtual media device, in accordance with some embodiments.

FIG. 7 shows a flowchart of an example method for communicating messages to a VM application using a virtual media device, in accordance with some embodiments. At block 705, a media image may be generated to include a message (e.g., scripts describing operations to be performed). The media image may be generated by a computer system (e.g., computer system 650 of FIG. 6) that is associated with a VM. At block 710, the media image may be mounted to a virtual media device associated with the VM. For some embodiments, the media image may be mounted by an application running in the computer system 650 (e.g., application 600) that has permission to perform such operation. The agent (e.g., agent 620) may verify the permission to confirm that the mounting of the media image is by a permissible application. It may be noted that even though the application 600 may have the permission to mount the media image, the application 600 may not know or have the credential information typically required by the guest OS (e.g., guest OS 545) to communicate with the VM application (e.g., application 615).

At block 715, the agent in the VM is notified that the media image is mounted. The agent may then access the media image to retrieve the message. At block 720, the message may be communicated to the VM application (e.g., application 615). The message may include one or more commands to cause the VM application to perform operations. At block 725, the agent may update the media image with status information based on completion of the operations performed by the VM application. At block 730, the agent may cause the virtual media device to eject. The ejection may be used as a completion notification to the computer system and application that mounted the media image. Using the virtual media vice and media image to communicate the message to the VM may be useful comparing to having to remember the credential information and/or compromising the security of the credential information.

Figure 8:
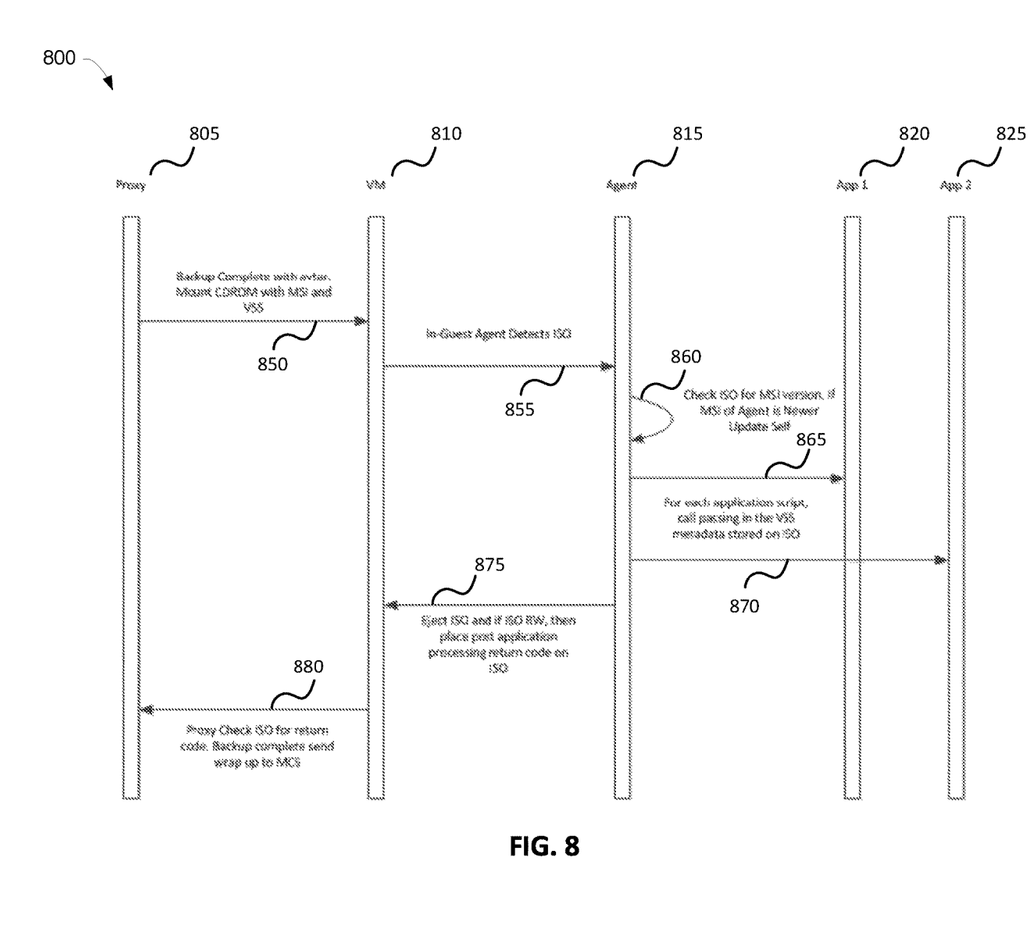
FIG. 8 shows an example of using a virtual media device in a backup operation of a VM, in accordance with some embodiments.

FIG. 8 shows an example of using the virtual media device in a backup operation of a VM, in accordance with some embodiments. In this example, the virtual media device is a CDROM of the VM and a media image is an ISO image. The proxy application 805 may be a backup application. The proxy application 805 may be considered to be running outside of the VM environment. When the backup operation of a VM is completed, it may be necessary for post processing operations to be performed in the VM. In this example, the proxy application 805 may initiate the post processing operations using the CDROM.

Operation 850 may include the mounting the CDROM with an ISO image. The ISO image may have a unique name that contains, for example, a Microsoft installer (MSI) package that an agent (e.g., agent 620 shown in FIG. 6) may access. The MSI package may include scripts describing operations to be performed. The MSI package may include Volume Shadow Copy Service (VSS) metadata. The VSS metadata is associated with VSS application that may requests a backup or a restore. The ISO image may be mounted in the CDROM for the VM 810 being backed up.

The agent may be running in the VM 810, and operation 855 shows that the agent monitors the CDROM for any mounting activities. The agent may be associated with a version number. The ISO image is mounted when there is a successful backup of the VM. When the mounting is detected, the agent may check the version of itself and of the MSI package. Operation 860 shows that if the version is newer, the agent may update itself.

Operations 865 and 870 show that the agent may invoke application scripts included in the MSI package. The agent may call each of the scripts one at a time passing in the VSS metadata. Each script may represent an action for a application such as application 820 or 825. Each of the applications 820 and 825 may get the opportunity to examine the VSS metadata and decide if the script should be used to perform operations. If Microsoft SQL server is installed, there may be SQL server metadata. After each script is executed, the VSS metadata may be cleaned up if stored in a temporary location.

Operation 875 shows that the agent can cause the CDROM to eject. If the CDROM is read-writable, the agent can provide status information for each script, update the ISO image, and then eject the CDROM. The ejection action signals the proxy application 805 (the backup application) that the post processing operation is complete. Operation 880 shows that the proxy application 805 monitors for the ejection of the CDROM and access the updated ISO image to check for the status information (e.g., return code). This may include sending the status information to Multi-Channel Server (MCS) software for the Microsoft SQL Server.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
  receiving, by a virtual machine (VM), a notification that a media image is mounted on a virtual media device of the VM, the media image including a message for one or more applications running in the VM, the message including commands that cause the one or more applications to perform operations;
  enabling, by the VM, an agent in the VM to access the virtual media device and retrieve the message from the media image;
  causing, by the VM, the agent to communicate the message to the one or more applications running in the VM; and
  enabling, by a guest operating system associated with the VM without requiring credential information, the one or more applications running in the VM to perform the operations based on the commands included in the message, the virtual media device being a CDROM, the media image is an International Standards Organization (ISO) image, and the one or more operations in the VM including post processing operations of a backup operation.

2. The method of claim 1, wherein the agent is configured to verify that the media image is generated by a permissible source and to retrieve the message from a known location in the media image.

3. The method of claim 1, further comprising enabling the agent to cause the virtual media device to eject based on completion of the operations.

4. The method of claim 1, further comprising enabling the agent to update the media image with status information based on completion of the operations.

5. The method of claim 2, wherein the guest OS associated with the VM is further configured to enable the one or more applications to perform the operations without requiring the credential information in response to the media image being mounted on the virtual media device by a permissible source.

6. A computer program product comprising computer-readable program code to be executed by one or more processors when retrieved from a non-transitory computer-readable medium, the program code including instructions to:
  receive a notification that a media image is mounted on a virtual media device of a virtual machine (VM), the media image including a message for one or more applications running in the VM, the message including commands that cause the one or more applications to perform operations;
  enable an agent in the VM to access the virtual media device and retrieve the message from the media image;
  cause the agent to communicate the message to the one or more applications running in the VM; and
  enable, by a guest operating system associated with the VM without requiring credential information, the one or more applications running in the VM to perform the operations based on the commands included in the message, the virtual media device being a CDROM, the media image being an International Standards Organization (ISO) image, and the one or more operations in the VM including post processing operations of a backup operation.

7. The computer readable medium of claim 6, wherein the agent is configured to verify that the media image is generated by a permissible source and to retrieve the message from a known location in the media image.

8. The computer readable medium of claim 6, further comprising enabling the agent to cause the virtual media device to eject based on completion of the operations.

9. The computer readable medium of claim 6, further comprising enabling the agent to update the media image with status information based on completion of the operations.

10. The computer readable medium of claim 6, wherein the guest OS associated with the VM is further configured to enable the one or more applications to perform the operations without requiring the credential information in response to the media image being mounted on the virtual media device by a permissible source.

11. A system comprising:
   a processor-based application executed on a computer system and configured to:
   receive a notification that a media image is mounted on a virtual media device of a virtual machine (VM), the media image including a message for one or more applications running in the VM, the message including commands that cause the one or more applications to perform operations;
   enable an agent in the VM to access the virtual media device and retrieve the message from the media image;
   cause the agent to communicate the message to the one or more applications; and
   enable, by a guest operating system associated with the VM without requiring credential information, the one or more applications running in the VM to perform the operations based on the commands included in the message, wherein the virtual media device is a CDROM, the media image is an International Standards Organization (ISO) image, and the one or more operations in the VM including post processing operations of a backup operation.

12. The system of claim 11, wherein the agent is configured to verify that the media image is generated by a permissible source and to retrieve the message from a known location in the media image.

13. The system of claim 11, further comprising enabling the agent to cause the virtual media device to eject based on completion of the operations.

14. The system of claim 11, further comprising enabling the agent to update the media image with status information based on completion of the operations.

15. The system of claim 11, wherein the guest OS associated with the VM is further configured to enable the one or more applications to perform the operations without requiring the credential information in response to the media image being mounted on the virtual media device by a permissible source.

* * * * *